US010013655B1

(12) United States Patent
Clark

(10) Patent No.: US 10,013,655 B1
(45) Date of Patent: Jul. 3, 2018

(54) ARTIFICIAL INTELLIGENCE EXPERT SYSTEM FOR ANOMALY DETECTION

(71) Applicant: Applied Underwriters, Inc., Omaha, NE (US)

(72) Inventor: David Alan Clark, San Mateo, CA (US)

(73) Assignee: Applied Underwriters, Inc., Omaha, NE (US)

( * ) Notice: Subject to any disclaimer, the term of this patent is extended or adjusted under 35 U.S.C. 154(b) by 0 days.

(21) Appl. No.: 15/081,991

(22) Filed: Mar. 28, 2016

Related U.S. Application Data

(63) Continuation-in-part of application No. 14/469,632, filed on Aug. 27, 2014, now abandoned.

(60) Provisional application No. 61/950,921, filed on Mar. 11, 2014.

(51) Int. Cl.
*G06N 5/02* (2006.01)
*G06F 17/30* (2006.01)

(52) U.S. Cl.
CPC ....... *G06N 5/022* (2013.01); *G06F 17/30728* (2013.01)

(58) Field of Classification Search
USPC ......... 705/4, 3, 2, 39, 40, 37; 235/380, 379; 714/26, 48, 38.14, 33, 25, 127; 717/168, 717/170, 120, 124; 706/45, 46, 50, 20, 706/12; 726/9, 10, 25; 707/692, 755, 707/917; 709/224, 223, 226; 703/27; 715/500; 386/248
See application file for complete search history.

(56) References Cited

U.S. PATENT DOCUMENTS

| 5,642,504 | A | * | 6/1997 | Shiga | G06F 11/3688 |
| 6,691,105 | B1 | | 2/2004 | Virdy | |
| 7,315,826 | B1 | * | 1/2008 | Guheen | G06F 17/3089 703/27 |
| 7,376,618 | B1 | | 5/2008 | Anderson et al. | |
| 7,613,687 | B2 | | 11/2009 | Nye | |
| 7,788,536 | B1 | * | 8/2010 | Qureshi | G06N 5/048 714/26 |

(Continued)

FOREIGN PATENT DOCUMENTS

WO   WO 2004/088476 A2   10/2004

OTHER PUBLICATIONS

Nowak, Boguslaw; Nowak, Maciej; Multi-Criteria Decision Aiding in Project Planning Using Decision Trees and Simulation; International Workshop on Multiple Criteria Decision Making. 2010/2011, p. 163-187. 25p.*

(Continued)

Primary Examiner — Tien C Nguyen
(74) Attorney, Agent, or Firm — Mark Nowotarski

(57) ABSTRACT

An artificial intelligence expert system detects an anomaly between an application and a publication provided by an applicant in a given class. The system calculates an application score then uses a decision tree to determine a publication score based on the presence or absence of tokens in the publication. An anomaly is detected when the ratio of the application score to the publication score is greater than a threshold value. The decision tree is trained using prior applications in the same class. The publication score of each leaf node of the decision tree is set equal to an average application score of the prior applications associated with the leaf node.

4 Claims, 4 Drawing Sheets

(56) References Cited

U.S. PATENT DOCUMENTS

| | | | |
|---|---|---|---|
| 7,813,944 B1 | 10/2010 | Luk et al. | |
| 7,831,451 B1 | 11/2010 | Morse et al. | |
| 7,899,762 B2 | 3/2011 | Iyengar et al. | |
| 8,073,789 B2 | 12/2011 | Wang et al. | |
| 8,412,645 B2 | 4/2013 | Ramaswamy et al. | |
| 8,412,656 B1 | 4/2013 | Baboo et al. | |
| 8,538,784 B2 | 9/2013 | Witkowski et al. | |
| 8,572,013 B1* | 10/2013 | Nash | G06F 17/30705 706/20 |
| 8,645,170 B2 | 2/2014 | Boone et al. | |
| 8,660,864 B2 | 2/2014 | Krause et al. | |
| 8,676,612 B2 | 3/2014 | Helitzer et al. | |
| 8,725,661 B1 | 5/2014 | Goldman et al. | |
| 8,805,754 B2 | 8/2014 | Zhou et al. | |
| 8,850,550 B2* | 9/2014 | Dalzell | G06F 21/335 726/10 |
| 8,972,325 B2 | 3/2015 | Varghese | |
| 9,088,596 B2 | 7/2015 | Ciocarlie et al. | |
| 9,141,914 B2 | 9/2015 | Viswanathan et al. | |
| 9,171,158 B2 | 10/2015 | Akoglu et al. | |
| 9,189,370 B2* | 11/2015 | Lee | G06F 11/3668 |
| 9,349,103 B2 | 5/2016 | Eberhardt, III et al. | |
| 9,378,465 B2 | 6/2016 | Stewart et al. | |
| 9,424,745 B1 | 8/2016 | Kagoshima et al. | |
| 9,430,952 B2 | 8/2016 | Bohra et al. | |
| 9,612,812 B2* | 4/2017 | Arcilla | G06F 21/57 |
| 2002/0055862 A1 | 5/2002 | Jinks | |
| 2002/0111835 A1 | 8/2002 | Hele et al. | |
| 2003/0125990 A1 | 7/2003 | Rudy et al. | |
| 2005/0091227 A1* | 4/2005 | McCollum | G06F 8/36 |
| 2005/0187865 A1* | 8/2005 | Grear | H04L 12/66 705/39 |
| 2006/0143175 A1* | 6/2006 | Ukrainczyk | G06F 17/218 |
| 2007/0094302 A1* | 4/2007 | Williamson | G06F 17/3041 |
| 2008/0086433 A1* | 4/2008 | Schmidtler | G06F 17/30707 706/12 |
| 2008/0183508 A1 | 7/2008 | Harker et al. | |
| 2009/0006616 A1* | 1/2009 | Gore | H04L 41/5009 709/224 |
| 2011/0015948 A1 | 1/2011 | Adams et al. | |
| 2012/0290330 A1 | 11/2012 | Coleman et al. | |
| 2013/0013345 A1 | 1/2013 | Wallquist et al. | |
| 2013/0018823 A1 | 1/2013 | Masood | |
| 2013/0226623 A1 | 8/2013 | Diana et al. | |
| 2013/0339220 A1 | 12/2013 | Kremen et al. | |
| 2013/0340082 A1 | 12/2013 | Shanley | |
| 2014/0114694 A1 | 4/2014 | Krause et al. | |
| 2014/0129261 A1 | 5/2014 | Bothwell et al. | |
| 2014/0180974 A1 | 6/2014 | Kennel et al. | |
| 2014/0214734 A1 | 7/2014 | Ozonat et al. | |
| 2015/0220862 A1 | 8/2015 | DeVries et al. | |

OTHER PUBLICATIONS

Wikipedia, Classification scheme, https://en.wikipedia.org/wiki/Classification_scheme, last viewed Mar. 10, 2016.
Wikipedia, Loss function, https://en.wikipedia.org/wiki/Loss_function, last viewed Oct. 21, 2015.
Wikipedia, Tree (data structure), https://en.wikipedia.org/wiki/Tree_(data_structure)#Terminology, last viewed Mar. 10, 2016.
De Vries, et al., U.S. Appl. No. 61/935,922 for System and Method for Automated Detection of Insurance Fraud dated Feb. 5, 2014.
SPSS Inc., AnswerTree™ 2.0 User's Guide pp. 1-99, 1998.
SPSS Inc., AnswerTree™ 2.0 User's Guide pp. 100-203, 1998.
Nasser Hadidi, Ph.D., Classification Ratemaking Using Decision Trees, 2003.
Hendrix, Leslie; Elementary Statistics for the Biological and Life Sciences, course notes University of South Carolina, Spring 2012.
Insurance Fund Manual, National Council on Compensation Insurance (NCCI) Classification of Industries pp. 218-219, Rev. Jul. 2012.
SAS, Combating Insurance Claims Fraud, How to Recognize and Reduce Opportunistic and Organized Claims Fraud, White Paper.
Lanzkowsky, Marc, The Claims SPOT, 3 Perspectives on the Use of Social Media in the Claims Investigation Process, http://theclaimsspot.com/2010/10/25/3-perspectives-on-the-use-of-social-media-in-the-claims-investigation-process/, dated Oct. 25, 2010.
Networked Insurance Agents, Workers' Compensation California Class Codes, Nov. 2010.
NAICS, 2012 Definition File Sector 11—Agriculture, Forestry, Fishing and Hunting.
NAICS, 2012 Definition File Sector 5617 Services to Buildings and Dwellings.
Wikipedia.com, Spokeo, https://en.wikipedia.org/wiki/Spokeo, Mar. 10, 2014.
WCIRB California, California Workers' Compensation Uniform Statistical Reporting Plan—1995 Title 10, California Code of Regulations Section 2318.6, Effective Jan. 1, 2014.
Wikipedia, Decision tree learning, May 12, 2014.
NCCI, Scopes Manual, Posted Mar. 1, 2014, https://www.ncci.com/manuals/scopes/scopes/scopes-r00399.htm.
WSJ Blogs, Gary Kremen's New Venture, Sociogramics, Wants to Make Banking Human Again, http://blogs.wsj.com/venturecapital/2012/02/24/gary-kremens-new-venture-sociogramics-raises-2m-to-make-banking-human-again/, dated Feb. 24, 2012.
Wikipedia.com, Hierarchy, https://en.wikipedia.org/wiki/Hierarchy, Mar. 1, 2016.
Wikipedia.com, Tree structure, https://en.wikipedia.org/wiki/Tree_structure, Mar. 1, 2016.

* cited by examiner

# ARTIFICIAL INTELLIGENCE EXPERT SYSTEM FOR ANOMALY DETECTION

BACKGROUND OF THE INVENTION

There is a long-felt need for an artificial intelligence expert system which can detect an anomaly in an application process.

SUMMARY OF THE INVENTION

The summary of the invention is provided as a guide to understanding the invention. It does not necessarily describe the most generic embodiment of the invention or the broadest range of alternative embodiments.

An artificial intelligence expert system detects an anomaly between an application and a publication provided by an applicant in a given class. The system calculates an application score using the application and then uses a decision tree to determine a publication score based on the presence or absence of tokens in the publication. An anomaly is detected when the ratio of the application score to the publication score is greater than a threshold value. The decision tree is trained using prior applications in the same class. Subsets of the prior applications are assigned to the leaf nodes of the decision tree. The publication score of each leaf node is set equal to an average application score of the prior applications associated with the leaf node. The threshold value is based on the upper tail of the distribution of anomaly ratios calculated for the prior applications.

DETAILED DESCRIPTION

The detailed description describes non-limiting exemplary embodiments. Any individual features may be combined with other features as required by different applications for at least the benefits described herein.

As used herein, the term "about" means plus or minus 10% of a given value unless specifically indicated otherwise.

As used herein, a "computer-based system" or "computer implemented system" comprises an input device for receiving data, an output device for outputting data in tangible form (e.g. printing or displaying on a computer screen), a permanent memory for storing data as well as computer code, and a microprocessor for executing computer code wherein said computer code resident in said permanent memory will physically cause said microprocessor to read-in data via said input device, process said data within said microprocessor and output said processed data via said output device.

As used herein, "web site" may comprise any information published by an entity on the World Wide Web. This includes company sponsored domains (e.g. www.companyA.com), Facebook® pages, LinkedIn® pages, Twitter® feeds or any other publication whose content is controlled by said entity. Web sites are considered public if their content can be retrieved via the Internet by a member of the public using a citation to the web site, such as a URL.

As used herein, a "decision tree" is a set of logical operations that determine a leaf node for an entity based on data associated with the entity. Commercially available decision tree modeling software develops a decision tree based on a set of training data. AnswerTree^ software is adequate for developing a decision tree. AnswerTree^ is a trademark of SPSS Inc.

Generating a Decision Tree for Anomaly Detection

In order to detect an anomaly between an application by an applicant and a publication by an applicant, a decision tree can be generated that relates the presence or absence of prospective tokens in publications produced by a training set of prior applicants and prior application scores calculated for said prior applicants. The prior application scores are produced by an application scoring algorithm using data from prior applications. The application scores are indicative of a loss function for said prior applicants. The training set is limited to prior applicants in the same class as the applicant. The class of an applicant is part of a classification scheme of applicants. The classification scheme may be hierarchical. The class of the applicant may be a terminal class within the hierarchical classification scheme.

Figure 1:
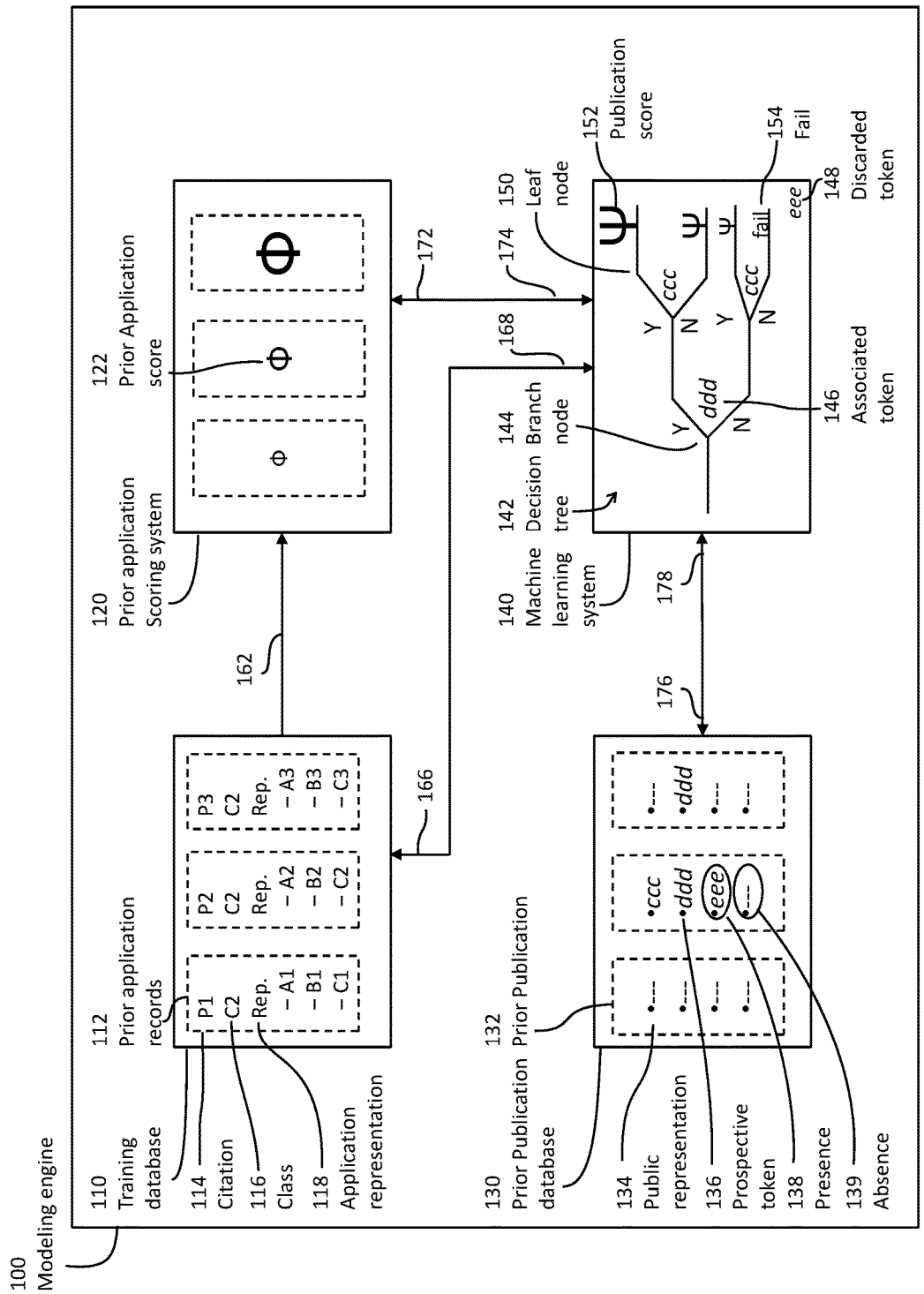
FIG. 1 illustrates a computer-based modeling engine.

FIG. 1 shows a computer implemented modeling engine 100 useful for generating decision trees for detecting an application anomaly of an applicant. The applicant is in a class of a classification scheme. An application score representing a loss function of the applicant is calculated using an application scoring algorithm. The modeling system comprises:

a) a training database 110 comprising:
 i) a plurality of prior application records 112 from a plurality of prior applicants, wherein each of said prior application records comprises:
  1) a citation 114 to a prior publication by a prior applicant;
  2) a class 116 of said prior applicant within said classification scheme; and
  3) an application representation 118 by said prior applicant about itself;
b) a computer implemented prior application scoring system 120 comprising computer readable instructions stored on a permanent memory operable to physically cause a microprocessor within said prior scoring system to:
 i) read in 162 said application representations of said prior applicants; and
 ii) calculate a prior application score 122 for each of said prior applicants using said application scoring algorithm;
c) a prior publication database 130 comprising said prior publications 132 wherein each of said prior publications comprises a public representation 134 by a prior applicant about itself, said prior publications being retrievable by a member of the public using said prior citations;
d) a machine learning system 140 comprising computer readable instructions stored on a permanent memory operable to physically cause a microprocessor within said machine learning system to:
 i) query 166 said training database using said class of said applicant to identify and count prior application records in said class of said applicant;
 ii) read in 168 from said training database said prior citations in said prior applications in said class of said applicant;

iii) query 172 said prior application scoring system using said class of said applicant to identify prior application scores for prior application records in said class of said applicant;

iv) read in 174 from said prior scoring system said prior application scores for prior application records in said class of said applicant;

v) query 176 said prior publication database using said class of said applicant to identify prior publications by said prior applicants in said class of said applicant;

vi) identify the presence 138 or absence 139 of one or more prospective tokens 136 in said prior publications by said prior applicants in said class of said applicant;

vii) read in 178 from said prior publications database said presence or absence of said one or more prospective tokens in said prior publications by said prior applicants in said class of said applicant;

viii) construct said decision tree 142 associated with said class of said applicant such that:

1) each branch node 144 of said decision tree associated with said class of said applicant is associated with one of said prospective tokens 146;

2) each leaf node 150 of said decision tree associated with said class of said applicant:

a) is associated with a subset of said prior application records in said class of said applicant and is either:

i) assigned a publication score 152 equal to an average of the prior application scores determined for each of said prior application records in said subset associated with said leaf node; or ii) assigned a fail mode 154 when there are none of said prospective tokens in said prior application records in said subset associated with said leaf node; and ix) construct a set of confirmed tokens consisting of the prospective tokens that are associated with the branch nodes of said decision tree associated with said class of said applicant.

Prospective tokens that are not associated with a branch of the decision tree may be discarded 148.

The number of branch nodes in the decision tree should be limited to avoid overfitting. A suitable limitation is not more than one branch node per 50 prior art applications in the training database. This helps insure that some of the more sparsely populated leaf nodes will still have enough associated prior application scores to have a meaningful average. The more sparsely populated leaf nodes should have at least 10 associated prior application scores.

The ratio of a publication score to an application score is defined herein as an "anomaly ratio". The distribution of anomaly ratios for the prior applications gives a measure of how good the fit is between the publications scores and the application scores. A distribution where 80% or more of the anomaly ratios fall between 0.75 and 1.25 is considered a good fit. The distribution can also be used to set a threshold factor for when the decision tree is applied to an applicant. If the threshold is set at the anomaly ratio where the upper tail of the distribution of 0.1 or less, then the number of false positives for detecting an anomaly will be acceptably low.

The process for generating decision trees and associated sets of confirmed tokens can be repeated for different classes within the classification scheme. The decision trees can be stored in a decision tree data base and retrieved for different applicants depending upon the class of the applicant. Decision trees may be limited to classes with a broad range of loss ratios for prior applicants. A spread in loss ratios of 1.5× or higher is considered adequately large.

Anomaly Detection System

Figure 2:
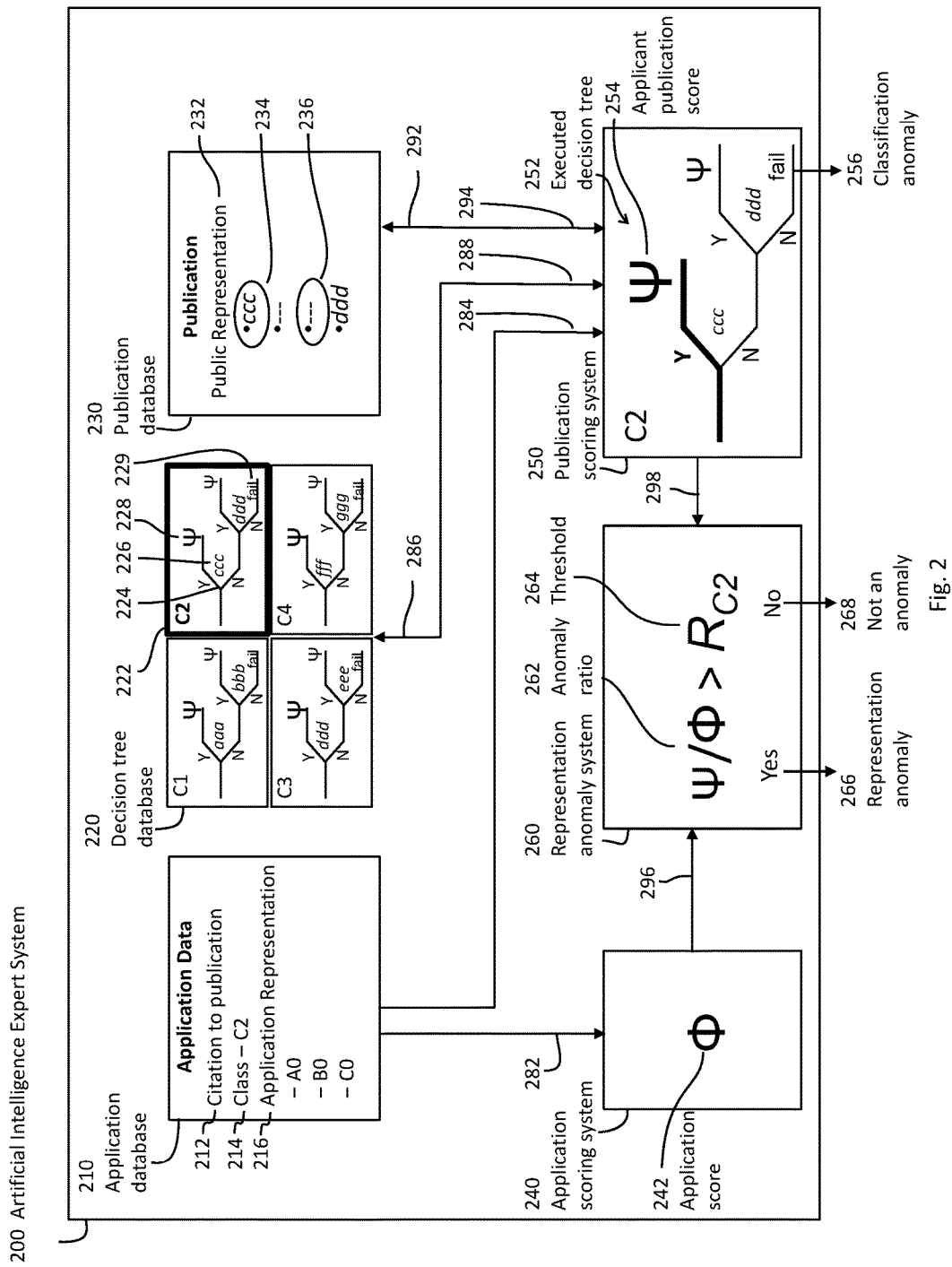
FIG. 2 illustrates a computer-based anomaly detection system.

FIG. 2 illustrates a computer implemented artificial intelligence expert system 200 for detecting an anomaly. The expert system comprises:

a) an application database 210 comprising application data from an applicant, said application data comprising:

i) a citation 212 to a publication by said applicant;

ii) a class 214 of said applicant within a classification scheme; and iii) an application representation 216 by said applicant about itself;

b) a decision tree database 220 comprising a decision tree 222 associated with said class, said decision tree comprising:

i) a token 226 from a set of confirmed tokens associated with said class, said token being associated with a branch node 224 of said decision tree;

ii) a publication score 228 associated with a first leaf node of said decision tree, said first leaf node being on a yes-branch of said branch node, said yes-branch being associated with said token being in said publication by said applicant; and iii) a fail mode 229 associated with a second leaf node of said decision tree, said second leaf node being on a no-branch of said branch node, said no-branch being associated with said token not being in said publication by said applicant;

c) a publication database 230 comprising said publication, said publication comprising a public representation 232 by said applicant about itself, said publication being retrievable by a member of the public using said citation;

d) a computer implemented application scoring system 240 comprising computer readable instructions stored on a permanent memory operable to physically cause a microprocessor within said application scoring system to:

i) read in 282 from said application database said application representation; and ii) calculate an application score 242 based on said application representation using an application scoring algorithm, said application score being indicative of a loss function for said applicant;

e) a computer implemented publication scoring system 250 comprising computer readable instructions stored on a permanent memory operable to physically cause a microprocessor within said publication scoring system to:

i) read in 284 from said application database:

1) said citation to a publication by said applicant; and 2) said class of said applicant;

ii) query 286 said decision tree database using said class to retrieve 288 from said decision tree database said decision tree associated with said class and said set of confirmed tokens associated with said class;

iii) query 292 said publication database using said citation and said set of confirmed tokens associated with said class to retrieve 294 from said publication database an indication of the presence 234 or absence 236 of each one of said confirmed tokens in said publication; and iv) execute 252 said decision tree based at least in part on said indication of the presence or absence of said confirmed tokens in said publication, said execution to either:
1) determine an applicant publication score 254; or
2) detect said fail mode as a classification anomaly 256 indicating that said applicant may not be in said class; and f) a computer implemented representation anomaly system 260 comprising computer readable instructions stored on a permanent memory operable to physically cause a microprocessor within said representation anomaly system to:
i) read in 296 said application score from said application scoring system;
ii) read in 298 said applicant publication score from said publication scoring system when said executed decision tree produces an applicant publication score;
iii) calculate an anomaly ratio 262 equal to the ratio of said applicant publication score to said application score;
iv) compare said anomaly ratio to a threshold 264 associated with said class; and
v) detect 266 a representation anomaly when said anomaly ratio is greater than said threshold, said representation anomaly indicating that said application representation by said applicant about itself may be inaccurate.

The representation anomaly system may indicate that there is no anomaly 268 if the anomaly ratio is less than or equal to the threshold. The decision tree database may comprise a plurality of decision trees each associated with a unique class in the classification scheme. Each decision tree may also be associated with a set of confirmed tokens also associated with a class in the classification scheme.

The citations may be URLs. The URLs may be to publications by an applicant, such as the applicant's commercial web site or social media page. The web pages or social media pages are considered public if they can be reached through a search engine, such as Google®, Yahoo® or Bing®.

An individual token may severally comprise a set of words, phrases, word stems, images, sounds or other media that are synonyms of each other. As used herein, "severally comprise", means that if any one of the words, phrases, word stems, images, sounds or other media in an individual token set are detected in a publication that indicates that the token is in the publication.

EXAMPLE

The anomaly detection systems described herein may be applied to any application process where an applicant provides an application to an examiner for approval, the application can be rated with a loss function, and the applicant provides publications about itself that can be reviewed. Said publications can be intentional or incidental. An intentional publication might be a web site authored by an applicant. An incidental publication might be a credit history, arrest record or a phone conversation that is monitored. Said application processes include but are not limited to applications for employment, insurance coverage, university admission, club membership, citizenship, loans, insurance claims adjudication, and grants. Applicants may be natural persons, automata, or juristic entities, such as corporations. Similarly, examiners can be natural persons, automata, or juristic entities.

The anomaly detection systems described herein were applied the process of a company applying for workers' compensation coverage for its employees. The application is referred to herein as a "submission". The loss function is "premium rate". A premium rate is a premium divided by the payroll of the covered employees in a company. A premium may be a pure premium. A pure premium is the expected cost of benefits provided to injured employees due to their injuries. An application score is referred to herein as a "submission-based premium rate". A publication score is referred to herein as a "web-based premium rate". The classification scheme for applicants is an industrial classification code. Prior application records are referred to as "historical submissions". The publications reviewed were web sites. The citations were URLs of web sites.

An anomaly detection decision tree was generated for the industrial classification code NAIC 561730 (Landscaping) using training data from 1,544 historical workers' compensation submissions from companies in said industrial classification. 561730 is a terminal class of the NAIC classification scheme. A set of prospective tokens was developed by individually reviewing the web sites of said submissions to identify words, phrases and word stems that in a reviewer's judgment seemed to be related to the level of injury hazard the employees of said companies might face while on the job. High risk phrases such as "tree removal" and "crane service" were commonly found on the web sites of companies with high submission-based premium rates (e.g. greater than $20 per $100 payroll). Low risk phrases such as "lawn mowing" and "leaf removal" were commonly found on web sites of companies with low submission-based premium rates (e.g. less than $10 per $100 payroll). After the set of prospective phrases were developed, they were grouped into 6 sets of synonyms. In this example, synonyms were words that indicated a common level of expected loss function. They were not necessarily literal synonyms of each other. Each of the 6 sets was then defined as a prospective token. A web scraping program written in Python® programming language was used to thoroughly examine the entire contents of the companies' web site domains to determine the presence or absence of said tokens on said domains. The token data and submission-based premium rates associated with said historical insurance submissions were read into the decision tree generating program AnswerTree™ running on an appropriate computer-based system. The decision tree generating program calculated the nodes and branches of a decision tree that grouped the historical submissions into leaf nodes that minimized the total standard deviation of the submission-based premium rates of the submissions grouped into each leaf node. The web-based submission rates of each leaf node were then set to the average submission-based premium rates weighted by the total payroll for each historical submission. More details of the algorithms used by AnswerTree are found in "AnswerTree™ 2.0 User's Guide", by SPSS Inc., 1998. Said guide is incorporated herein by reference.

Figure 3:
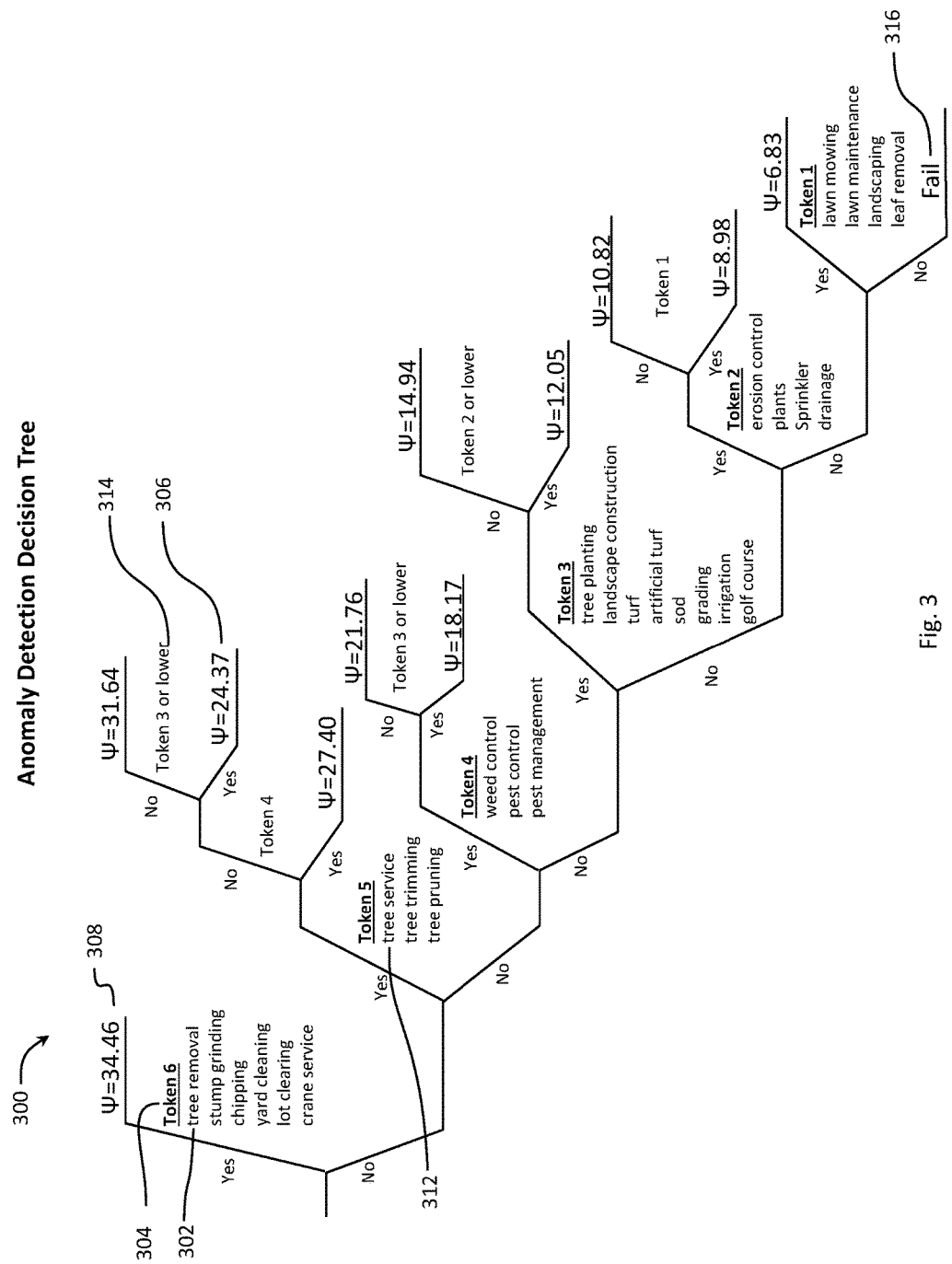
FIG. 3 illustrates a decision tree.

FIG. 3 illustrates the calculated anomaly detection decision tree 300. Six tokens 304 are shown along with their respective synonym phrases 302. The nodes and branches of the tree indicate how to arrive at a web-based premium rate 306, depending upon the presence or absence of particular tokens on a company's web site. Some phrases were so strongly correlated with worker risk that their mere presence on a web site indicated that the highest premium rate 308 was appropriate no matter what other tokens were present. "Tree removal" 302 was one such phrase grouped into token 6. Other phrases, such as "tree service" 312, indicated that lower premium rates may be suitable if lower risk tokens were present, such as token 3 or lower (item 314). If none of the tokens were present, then the output of the decision tree is "fail" 316. As discussed above, "fail" may indicate that a given submission is not actually in the classification provided in the submission.

Figure 4:
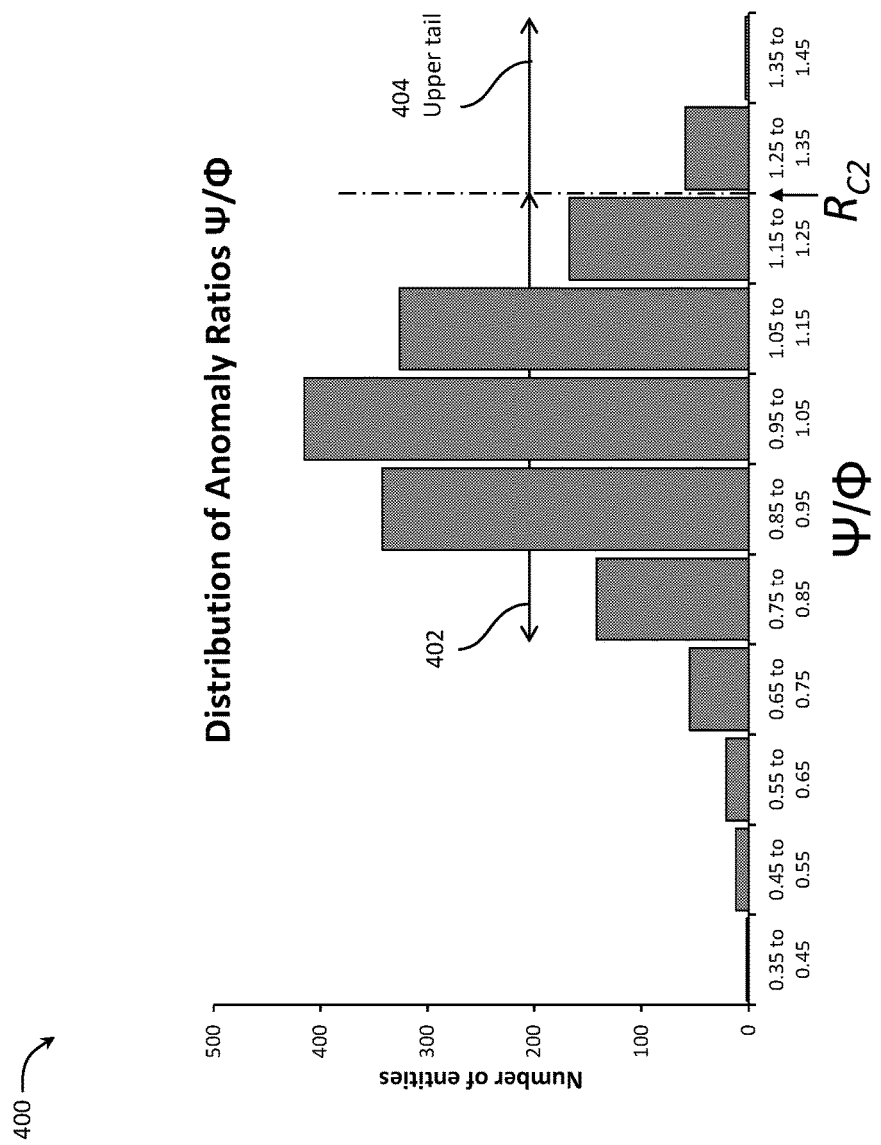
FIG. 4 shows a distribution of anomaly ratios for the training data for the decision tree of FIG. 3.

FIG. 4 shows a bar graph 400 of the distribution of anomaly ratios ($\psi/\phi$) calculated for the web-based premium rates and the submission-based premium rates. The number of submissions in each bin (e.g. 0.75 to 0.85) of the bar graph is shown. 90% of the anomaly ratios (item 402) fall in the bin ranges of 0.75 to 1.25. This is considered a very good fit particularly in light of the relatively small number of reference tokens that were used (i.e. 6). Only 4% of the error ratios 404 were in bins of 1.25 or greater. The upper tail of the distribution, therefore, was set at 0.04 and the anomaly ratio of 1.25 was set as the anomaly detection threshold (item 268 FIG. 2). Thus this decision tree would have a relatively low false positive rate if its predetermined threshold ratio 264 (FIG. 2) were set to 1.25 or greater. A decision tree is considered a good fit if the upper tail of the distribution is 0.10 or less at an anomaly ratio of 1.25.

The decision tree generating process can then be repeated for other sets of historical submissions in other terminal or non terminal classes of a classification scheme. Not all industries in the classification scheme need to have an anomaly detection decision tree. Certain industries tend to have a wider spread in premium rate at their classification code than others. A spread of a factor of 1.5 or greater in a terminal class indicates the need for a decision tree. "Spread" as used herein refers to the ratio of a high value to a low value for a given parameter. Table 1 provides examples of industries that have a spread in workers' compensation premium rates of 1.5 or greater. The list is not exhaustive.

TABLE 1

| Industry | Low Premium rate $/$100 payroll | High Premium Rate $/$100 payroll | Spread of High/Low premium rate |
|---|---|---|---|
| Farming | $7 | $24 | 3.4 |
| Mining | $5 | $36 | 7.2 |
| Metal Manufacturing | $8 | $17 | 2.1 |
| Box Manufacturing | $8 | $20 | 2.5 |
| Stores and Dealers | $3 | $21 | 7.0 |
| Trucking | $3 | $10 | 3.3 |
| Construction | $7 | $46 | 6.6 |
| Landscaping | $6 | $36 | 6.0 |

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

I claim:

1. A computer implemented artificial intelligence expert system for anomaly detection comprising:
   a) an application database comprising application data from an applicant, said application data comprising:
      i) a citation to a publication by said applicant;
      ii) a class of said applicant within a classification scheme; and
      iii) an application representation by said applicant about itself;
   b) a decision tree database comprising a decision tree associated with said class, said decision tree comprising:
      i) a token from a set of confirmed tokens associated with said class, said token being associated with a branch node of said decision tree;
      ii) a publication score associated with a first leaf node of said decision tree, said first leaf node being on a yes-branch of said branch node, said yes-branch being associated with said token being in said publication by said applicant; and
      iii) a fail mode associated with a second leaf node of said decision tree, said second leaf node being on a no-branch of said branch node, said no-branch being associated with said token not being in said publication by said applicant;
   c) a publication database comprising said publication, said publication comprising a public representation by said applicant about itself, said publication being retrievable by a member of the public using said citation;
   d) a computer implemented application scoring system comprising computer readable instructions stored on a permanent memory operable to physically cause a microprocessor within said application scoring system to:
      i) read in from said application database said application representation; and
      ii) calculate an application score based on said application representation using an application scoring algorithm, said application score being a loss function for said applicant;
   e) a computer implemented publication scoring system comprising computer readable instructions stored on a permanent memory operable to physically cause a microprocessor within said publication scoring system to:
      i) read in from said application database:
         1) said citation to a publication by said applicant; and
         2) said class of said applicant;
      ii) query said decision tree database using said class to retrieve from said decision tree database said decision tree associated with said class and said set of confirmed tokens associated with said class;
      iii) query said publication database using said citation and said set of confirmed tokens associated with said class to retrieve from said publication database an indication of the presence or absence of each one of said confirmed tokens in said publication; and
      iv) execute said decision tree based at least in part on the presence or absence of said token in said publication, said execution to either:
         1) determine an applicant publication score; or
         2) detect said fail mode as a classification anomaly indicating that said applicant may not be in said class;

f) a computer implemented representation anomaly system comprising computer readable instructions stored on a permanent memory operable to physically cause a microprocessor within said representation anomaly system to:
  i) read in said application score from said application scoring system;
  ii) read in said applicant publication score from said publication scoring system when said executed decision tree produces an applicant publication score;
  iii) calculate an anomaly ratio equal to the ratio of said applicant publication score to said application score;
  iv) compare said anomaly ratio to a threshold associated with said class; and
  v) detect a representation anomaly when said anomaly ratio is greater than said threshold, said representation anomaly indicating that said application representation by said applicant about itself may be inaccurate; and
g) a computer implemented modeling engine comprising:
  i) a training database comprising:
    1) a plurality of prior application records from a plurality of prior applicants, wherein each of said prior application records comprises:
      a) a citation to a prior publication by a prior applicant;
      b) a class of said prior applicant within said classification scheme; and
      c) an application representation by said prior applicant about itself;
  ii) a computer implemented prior application scoring system comprising computer readable instructions stored on a permanent memory operable to physically cause a microprocessor within said prior scoring system to:
    1) read in said application representations of said prior applicants; and
    2) calculate a prior application score for each of said prior applicants using said application scoring algorithm;
  iii) a prior publication database comprising said prior publications wherein each of said prior publications comprises a public representation by a prior applicant about itself, said prior publications being retrievable by a member of the public using said prior citations; and
  iv) a machine learning system comprising computer readable instructions stored on a permanent memory operable to physically cause a microprocessor within said machine learning system to:
    1) query said training database using said class of said applicant to identify and count prior application records in said class of said applicant;
    2) read in from said training database said prior citations in said prior applications in said class of said applicant;
    3) query said prior application scoring system using said class of said applicant to identify prior application scores for prior application records in said class of said applicant;
    4) read in from said prior scoring system said prior application scores for prior application records in said class of said applicant;
    5) query said prior publication database using said class of said applicant to identify prior publications by said prior applicants in said class of said applicant;
    6) identify the presence or absence of one or more prospective tokens in said prior publications by said prior applicants in said class of said applicant;
    7) read in from said prior publications database said presence or absence of said one or more prospective tokens in said prior publications by said prior applicants in said class of said applicant;
    8) construct said decision tree associated with said class of said applicant such that:
      a) each branch node of said decision tree associated with said class of said applicant is associated with one of said prospective tokens; and
      b) each leaf node of said decision tree associated with said class of said applicant:
      i) is associated with a subset of said prior application records in said class of said applicant and is either:
        1) assigned a publication score equal to an average of the prior application scores determined for each of said prior application records in said subset associated with said leaf node; or
        2) assigned said fail mode when there are none of said prospective tokens in said prior application records in said subset associated with said leaf node; and
    9) construct said set of confirmed tokens consisting of the prospective tokens that are associated with the branch nodes of said decision tree associated with said class of said applicant.

2. The computer implemented artificial intelligence expert system of claim 1 wherein the number of branch nodes in said decision tree associated with said class of said applicant is not more than $\frac{1}{50}$ of said counted number of prior application records in said class of said applicant.

3. The computer implemented artificial intelligence expert system of claim 1 wherein said machine learning system further comprises computer readable instructions stored on a permanent memory operable to physically cause a microprocessor within said machine learning system to:
  a) calculate a prior anomaly ratio for each of said prior application records in said class of said applicant, said prior anomaly ratio being equal to the ratio of the publication score for the leaf node associated with said prior application record and the prior application score associated with said prior application record;
  b) determine an anomaly ratio distribution for said prior anomaly ratios; and
  c) set said threshold associated with said class equal to the anomaly ratio of a predetermined value of the upper tail of said anomaly ratio distribution.

4. The computer implemented artificial intelligence expert system of claim 3 where said predetermined value of the upper tail said of said distribution is 0.10 or less.

* * * * *